(12) United States Patent
Hofer (10) Patent No.: US 11,247,582 B2
(45) Date of Patent: Feb. 15, 2022

(54) CONTROL ELECTRONICS FOR A BATTERY SYSTEM, METHOD FOR POWER SUPPLYING CONTROL ELECTRONICS FOR A BATTERY SYSTEM, BATTERY SYSTEM AND VEHICLE

(71) Applicant: Samsung SDI Co., Ltd., Yongin-si (KR)

(72) Inventor: Maximilian Hofer, Hartberg (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 62 days.

(21) Appl. No.: 16/839,372

(22) Filed: Apr. 3, 2020

(65) Prior Publication Data

US 2020/0317085 A1 Oct. 8, 2020

(30) Foreign Application Priority Data

Apr. 8, 2019 (EP) .................................... 19167789
Mar. 31, 2020 (KR) ........................ 10-2020-0039258

(51) Int. Cl.
*B60L 58/20* (2019.01)
*H02J 7/00* (2006.01)
(Continued)

(52) U.S. Cl.
CPC ............... *B60L 58/20* (2019.02); *B60L 50/66* (2019.02); *B60L 53/22* (2019.02); *H02J 7/0024* (2013.01);
(Continued)

(58) Field of Classification Search
CPC .......... B60L 58/20; B60L 50/66; B60L 53/22; B60L 2210/12; B60L 2210/14;
(Continued)

(56) References Cited

U.S. PATENT DOCUMENTS 10,381,821 B2 * 8/2019 Djelassi et al. ........ H02H 3/247
2018/0208066 A1 7/2018 Rao et al.

FOREIGN PATENT DOCUMENTS

CN 104638724 A 5/2015
EP 1 494 332 A2 1/2005
(Continued)

OTHER PUBLICATIONS

Extended European Search Report issued in European Patent 19167789.7 dated Oct. 18, 2019, 8 pages.
(Continued)

*Primary Examiner* — Sun J Lin
(74) *Attorney, Agent, or Firm* — Lewis Roca Rothgerber Christie LLP (57) ABSTRACT

Control electronics for a battery system of a vehicle with a low voltage battery include a first direct current to direct current (DC/DC) converter including a first input terminal configured to be connected to the battery system, and an output terminal connected to a microcontroller, a wake-up circuit including a low voltage sub circuit and a sub circuit on a high voltage side that are galvanically isolated, and a second DC/DC converter including an input terminal configured to be connected to the low voltage battery, and an output terminal connected to the wake-up circuit, wherein the low voltage sub circuit is configured to transmit electrical energy received from the second DC/DC converter to the sub circuit on the high voltage side, and wherein the sub circuit on the high voltage side is configured to receive electrical energy from the low voltage sub circuit and to transmit the electrical energy to the first DC/DC converter.

14 Claims, 5 Drawing Sheets

(51) Int. Cl.
*B60L 50/60* (2019.01)
*B60L 53/22* (2019.01)
*B60K 6/28* (2007.10)

(52) U.S. Cl.
CPC ............ *B60K 6/28* (2013.01); *B60L 2210/12* (2013.01); *B60L 2210/14* (2013.01); *B60L 2210/30* (2013.01); *B60L 2210/42* (2013.01); *B60Y 2200/91* (2013.01); *B60Y 2200/92* (2013.01); *H02J 2207/20* (2020.01)

(58) Field of Classification Search
CPC B60L 2210/42; B60L 2210/30; H01J 7/0024; B60K 6/28; H02J 2207/20
USPC .......................................................... 320/107
See application file for complete search history.

(56) References Cited

FOREIGN PATENT DOCUMENTS

| | | |
|---|---|---|
| EP | 2 574 494 A2 | 4/2013 |
| EP | 3 360 719 A1 | 8/2018 |
| KR | 10-2006-0108149 A | 10/2006 |
| KR | 10-2018-0057191 A | 5/2018 |
| KR | 10-2018-0088245 A | 8/2018 |

OTHER PUBLICATIONS

EP Office action issued in corresponding application No. EP 19 167 789.7, dated Jun. 8, 2021, 4 pages.

\* cited by examiner

CONTROL ELECTRONICS FOR A BATTERY SYSTEM, METHOD FOR POWER SUPPLYING CONTROL ELECTRONICS FOR A BATTERY SYSTEM, BATTERY SYSTEM AND VEHICLE

CROSS-REFERENCE TO RELATED APPLICATION

This application claims priority to and the benefit of European Patent Application No. 19167789.7, filed in the European Patent Office on Apr. 8, 2019, and Korean Patent Application No. 10-2020-0039258, filed on Mar. 31, 2020, the entire contents of both of which are incorporated herein by reference.

1. FIELD

Aspects of the present invention relate to control electronics for a battery system.

2. DESCRIPTION OF THE RELATED ART

A rechargeable or secondary battery differs from a primary battery in that it can be repeatedly charged and discharged, while the primary battery provides only an irreversible conversion of chemical to electrical energy. Low-capacity rechargeable batteries are used as power supplies for small electronic devices, such as cellular phones, notebook computers and camcorders, while high-capacity rechargeable batteries are used as power supplies for hybrid vehicles and the like.

In general, rechargeable batteries include an electrode assembly including a positive electrode, a negative electrode, and a separator interposed between the positive and negative electrodes, a case receiving the electrode assembly, and an electrode terminal electrically connected to the electrode assembly. An electrolyte solution is injected into the case to enable charging and discharging of the battery via an electrochemical reaction of the positive electrode, the negative electrode, and the electrolyte solution. The shape of the case, which may, for example, be cylindrical or rectangular, depends on the battery's intended purpose.

Rechargeable batteries may be used as a battery module formed of a plurality of unit battery cells coupled in series and/or in parallel so as to provide a high energy density, for example, for motor driving of a hybrid vehicle. That is, the battery module is formed by interconnecting the electrode terminals of the plurality of unit battery cells depending on a desired amount of power and in order to realize a high-power rechargeable battery, for example, for an electric vehicle. One or more battery modules are mechanically and electrically integrated, equipped with a thermal management system and set up for communication with one or more electrical consumers in order to form a battery system.

For meeting the dynamic power demands of various electrical consumers connected to the battery system a static control of battery power output and charging is not sufficient. Thus, it is desired to have steady or intermittent exchange of information between the battery system and the controllers of the electrical consumers. This information includes the battery system's actual state of charge (SoC), potential electrical performance data, charging ability and internal resistance as well as actual or predicted power demands or surpluses of the consumers.

For monitoring, controlling, and/or setting of the aforementioned parameters, a battery system usually includes a battery management unit (BMU) and/or a battery management system (BMS). Such control units may be an integral part of the battery system and disposed within a common housing, or may be part of a remote control unit communicating with the battery system via a suitable communication bus. In both cases, the control unit communicates with the electrical consumers via a suitable communication bus, for example, a controller area network (CAN) or a serial peripheral interface (SPI).

The aforementioned control electronics of a battery system, for example, a battery system manager (BSM), a BMS, a BMU, or a system basis chip (SBC), can be supplied with power by the battery system they are controlling. This allows reducing the construction space of the battery system, as an additional power source for the control electronics can be omitted. However, depending on the output voltage (e.g., 48 V) of the battery system (e.g., a high voltage battery system), regulation of this output voltage may be desired.

Further, electronic components of vehicles are usually supplied via an electrical board system operating at a voltage of 12 V. The 12 V board net might be related to security relevant functions. For example, an electronic control unit (ECU) of a power steering system or an ECU of an anti-skid system may be integrated in the 12 V board net. The 12 V board net may include a 12 V battery system, such as a lead-acid based 12 V battery, that may be charged by a starter generator.

To make a battery system's control electronics compatible with the vehicle's electronic components, control electronics may be operated at a voltage near 12 V. When the battery system is providing an output voltage higher than 12 V, such as 48 V, and is supposed to self-supply the BMS and/or BMU, it is desirable for the output voltage to be regulated.

Also, during idle periods, that is, during periods of minimal power consumption (e.g., while an electric vehicle is parked), various parameters, such as battery voltages and internal resistances, are periodically controlled during wake-up periods to avoid a system failure, for example, due to a thermal runaway or short circuits of individual cells. To provide a time scale, for example, for the wake up of the control electronics, for example, a battery monitoring unit (BMU) and/or a battery management system (BMS), the battery system includes a real time clock (RTC).

The RTC is usually provided as integrated circuit (IC) and may include a crystal oscillator or may use the power line frequency for deriving the time scale. The RTC is be continuously energized to keep track of running time and may further include a volatile or non-volatile memory to keep track of time related information such as calendar date.

Although, the self-supply of control electronics for a battery system is desired, particularly in electric cars, the voltage conversion can amount to significant energy losses. Particularly during a sleep or idle mode, the energy losses due to voltage conversion can be as high as or higher than the energy losses due to controlling or RTC power consumption.

It is thus an aspect of embodiments of the present invention to overcome or at least reduce the drawbacks of the related art and to provide a battery system, particularly control electronics for a battery system, that allows for self-supply of a battery system, while reducing the power consumption during idle periods of the battery system and/or sleep mode of the control electronics. It is further desired that the safety measures be met, that construction space requirements be small, and that a supply of power to an RTC be ensured during the lifetime of the battery system.

SUMMARY

One or more of the drawbacks of the related art could be avoided or at least reduced by means of the present invention.

Aspects of some embodiments of the present invention are directed to a battery system of a vehicle including a low voltage battery. The control electronics of the invention are hybrid power-supplied control electronics.

Aspects of some embodiments of the present invention are further directed to a method for supplying power to such control electronics (particularly in a self-supplied manner and in a vehicle), to a battery system with the control electronics, and to a vehicle with such a battery system.

According to a first embodiment of the invention, there is provided control electronics for a battery system that are configured to be utilized in a vehicle, such as an electric vehicle, that further includes a low voltage battery. The low voltage battery is a common starter battery and the battery system may be a high voltage battery system for motor driving of the vehicle. The control electronics are configured for being used with an HV battery system and the low voltage battery by including respective power inputs nodes for a high voltage and a low voltage.

The control electronics according to embodiments of the present invention include a first DC/DC converter with a first input node that is configured to be connected to the battery system, for example, to a power output node of the battery system, to receive a high supply voltage from the battery system. The first DC/DC converter further includes an output node, for example, a power output node, which is connected to a microcontroller for supplying power to the microcontroller. The microcontroller is also part of the control electronics and is configured to control the first DC/DC converter. In some examples, the microcontroller may be configured to control the conversion ratio, that is, the ratio between the input voltage and the output voltage, of the first DC/DC converter. According to some examples, the first DC/DC converter may be a buck converter, a boost converter, or a buck-boost converter, and the microcontroller may be configured to control the duty cycle of such DC/DC converter. In some examples, the microcontroller may be configured to transmit a first control signal to a switching input of the first DC/DC converter. However, other suitable DC/DC converter types, as recognized by a person of ordinary skill in the art, may also be used, such as charge pumps or the like. The microcontroller may be further configured to perform at least one control function with respect to the battery system, such as measuring voltages, currents, and/or the like, and performing active and/or passive balancing.

The control electronics further include a wake-up circuit, which includes a low voltage sub circuit and a sub circuit on the high voltage side (e.g., a high voltage sub circuit) that are galvanically isolated from each other. In other words, the low voltage sub circuit and the sub circuit on the high voltage side form a functional unit that is configured to wake up the first DC/DC converter in response to receiving a wake-up signal as described in further detail below, while being galvanically isolated from each other. The galvanic isolation can be realized in a capacitive or an inductive manner. Without restricting the present invention's scope of protection, and solely to ease the understanding, an inductive form of galvanic isolation is described in more detail in the following. Further, waking up the first DC/DC converter refers to controlling the first DC/DC converter, for example, the duty cycle of the first DC/DC converter, for a time period (e.g., a minimal time period) that allows the first DC/DC converter to power the microcontroller for a time period that allows the microcontroller to establish control of the first DC/DC controller, for example, of the duty cycle thereof.

The control electronics further include a second DC/DC converter that has an input node that is configured to be connected to the low voltage battery, for example, to a power output of the low voltage battery, for receiving a low supply voltage from the low voltage battery. The second DC/DC converter may further include an output node that is connected to the wake-up circuit, for example, to the low voltage sub circuit of the wake-up circuit. In other words, the second DC/DC converter is configured to provide its output voltage, that is, electrical energy, to the low voltage sub circuit irrespective of the battery system (e.g., the high voltage battery system). The low voltage sub circuit is configured to transmit the electrical energy received from the second DC/DC converter, which may be received via a power input of the low voltage sub circuit, to the sub circuit on the high voltage side in response to a received wake-up signal. The electrical energy is transmitted across the galvanic isolation and might be transmitted in any form, such as current, voltage, light, and/or the like. For example, the electrical energy may be transmitted as a voltage signal. The wake-up signal may be applied to a signal input of the low voltage sub circuit to selectively transmit the energy continuously provided to the low voltage sub circuit to the sub circuit on the high voltage side. Further, in the control electronics according to embodiments of the present invention, the sub circuit on the high voltage side is configured to receive the electrical energy from the low voltage sub circuit and to transmit it to the first DC/DC converter. In some examples, the sub circuit on the high voltage side may be configured to transmit the electrical energy to a switching input of the DC/DC converter for controlling the DC/DC converter. In other words, the wake-up circuit, for example, the sub circuit on the high voltage side, is configured to control the first DC/DC controller in response to a wake-up signal applied to the wake-up circuit, for example, to the sub circuit on the high voltage side, at least for a given period.

The control electronics of the invention are thus configured to be hybrid supplied by a battery system and by an LV battery of a vehicle, wherein different subunits (or constituent components) of the control electronics are supplied with power by the battery system and/or the LV battery depending on the function of the subunits. The microcontroller of the HV battery system is normally supplied power from the battery system via the first DC/DC converter, that is, not by the LV domain. The power to the wake-up circuit is normally supplied by the LV battery. Further, the first DC/DC converter is configured to operate during a normal mode under the control of the microcontroller, that is, during an operation mode of the microcontroller. However, as the first DC/DC converter is controlled by the microcontroller, the first DC/DC converter is configured to be switched off during the sleep mode of the microcontroller. In the control electronics of the invention, the first DC/DC converter can be started by galvanic energy transfer from the low voltage sub circuit to the sub circuit on the high voltage side of the wake-up circuit. Hence, substantially no sleep current is consumed from the battery system and thus power consumption of the microcontroller in sleep mode is zero or substantially zero. The wake-up may be performed by the wake-up circuit in response to a wake-up signal that may be applied from the vehicle, for example, upon starting the ignition of the vehicle. The wake-up signal may be provided to the wake-up circuit via the second DC/DC converter, such as, a low-dropout (LDO) regulator, or via an RTC of the control electronics.

The control electronics according to embodiments of the present invention thus solve the challenge of the power supply of a self-supplied battery system during the sleep mode. For a battery system according to the related art, the first DC/DC converter from a high voltage domain of the battery system (e.g., 400 V) is utilized to supply the control electronics, which may be on a lower power domain. The first DC/DC converter is even available when the low voltage battery of the board net is not available anymore. Therefore, the battery system could operate even without, or independent of, the low voltage battery, which is mainly utilized for startup. However, with such a related art configuration, the first DC/DC converter would have very high power consumption during the sleep mode. Further, because the supplied current is very low in the sleep mode, the efficiency of the first DC/DC converter may also be very low. This issue may be alleviated by bypassing the first DC/DC converter in sleep mode, for example, via an LDO regulator, to compensate for the poor efficiency of the first DC/DC converter (which may, for example, be a buck, boost, or buck-boost converter). However, in the case of a 400 V battery system, the efficiency of an LDO regulator may be very poor. On one hand, the voltage drop over the LDO regulator may be very high, and on the other hand, high voltage transistors are used, which may be expensive. The control electronics according to embodiments of the present invention solve this by supplying the components, which are also supplied with power during the sleep mode by the low voltage battery of the vehicle via a second DC/DC converter. Due to the low voltage, the power losses in the second DC/DC converter are much less. Here, the second DC/DC converter may be an LDO regulator. Further control electronics may be controlled by the low voltage battery, depending on whether they are not required to fulfill availability requirements, for example, of the automotive safety integrity level (ASIL) B.

According to an embodiment of the present invention, the first DC/DC converter is configured to generate a supply voltage for the microcontroller based on an output voltage of the battery system. That is, the microcontroller for controlling the battery system is self-supplied via the battery system. However, as the microcontroller is also configured to control the first DC/DC converter, this configuration could not wake-up anymore once it is in sleep mode. Hence, an external wake-up circuit may be provided. The microcontroller may be configured to provide at least one control function with respect to one or more battery cells of the battery system, while receiving its supply voltage. For example, the microcontroller may be configured to measure the voltage and/or temperature of at least one battery cell and/or to provide active and/or passive balancing of at least one cell.

In an embodiment of the control electronics, the wake-up circuit includes an isolated DC/DC converter. In other words, the low voltage sub circuit and the sub circuit on the high voltage side form an isolated DC/DC converter, wherein the low voltage sub circuit forms a power input stage and the sub circuit on the high voltage side forms a power output stage of the isolated DC/DC converter. The isolated DC/DC converter is, for example, one of a regulated, unregulated, and semi-regulated isolated DC/DC converter. For example, the low voltage sub circuit may include an input stage that is configured to receive an input voltage from the second DC/DC converter, may further include a DC/AC inverter that is configured to receive the input voltage from the input stage and to output an AC voltage to a first electrode of at least one capacitor or to at least one primary winding of a transformer.

According to some examples, either the capacitor or the transformer may realize the galvanic isolation between the low voltage sub circuit and the sub circuit on the high voltage side. Further, the sub circuit on the high voltage side includes an AC/DC rectifier that is configured to receive an AC voltage from a second electrode of the at least one capacitor or from at least one secondary winding of the transformer and to output a DC voltage. The sub circuit on the high voltage side further includes an output stage that is configured to output the DC voltage received from the AC/DC rectifier to the first DC/DC converter, for example, to a switching input of the first DC/DC converter. However, this is just an example embodiment and other configurations of isolated DC/DC converter as known to the skilled person may also be utilized. The embodiment including capacitors for galvanic isolation allows for a highly efficient transfer of energy from the low voltage to the high voltage side.

In a further embodiment of the present invention, the sub circuit on the high voltage side, for example, the output stage thereof, is further configured to generate a PWM signal for controlling the first DC/DC converter from the electrical energy received from the low voltage sub circuit, for example, from the DC voltage received from the AC/DC rectifier. In this embodiment, the first DC/DC converter is a buck-, boost-, or buck-boost converter, and the PWM signal sets the duty cycle of such a converter.

In a further embodiment, the control electronics further include a system basis chip (SBC) which is interconnected between the first DC/DC converter and the microcontroller. However, the SBC might also form a part of the microcontroller. The SBC may be configured to perform at least one of the following functions: voltage regulation, supervision, reset generation, watchdog functions, functions related to bus interfaces (e.g., local interface network (LIN), CAN, SPI, and/or the like), wake-up logic functions, and power switching functions.

In some examples, the control electronics may further include a CAN transceiver that is supplied with electrical power via the second DC/DC converter. For example, the CAN transceiver may be interconnected between the output node of the second DC/DC converter and the wake-up circuit, for example, the low voltage sub circuit. In other words, the CAN transceiver is supplied with power by the low voltage battery and thus also in sleep mode of the microcontroller. The CAN transceiver is further connected to a CAN bus and configured to perform CAN communication via the CAN bus. For example, the CAN transceiver may be configured to receive a wake-up signal via the CAN bus and, in response thereto, transmit (e.g., forward) a wake-up signal to the low voltage sub circuit of the wake-up circuit. The CAN bus may form a part of a vehicle CAN net and hence the CAN transceiver provides the connection between such CAN net and the control electronics. The CAN transceiver may be further connected to the microcontroller via a CAN interface, and thus, also provide the connection between such CAN net and the microcontroller. For example, the microcontroller may thus be informed of the power demands of the vehicle and may, for example, control the power output of the battery system accordingly.

Further, the control electronics also include a real time clock (RTC) that is supplied with power by the low voltage battery and the second DC/DC converter, that is, via the second DC/DC converter, and that is connected to the microcontroller via an SPI. The real time clock may be provided as an integrated circuit (IC) and may include a crystal oscillator or may use a power line frequency for deriving the time scale. The RTC may be connected to the CAN transceiver and/or to the wake-up circuit. Further, the RTC may be supplied with power via the CAN transceiver and/or to the wake-up circuit. Hence, the CAN transceiver may be interconnected between the output node of the second DC/DC converter and the RTC. In some examples, the RTC may be configured to generate a wake-up signal and to transmit the wake-up signal to the low voltage sub circuit of the wake-up circuit. The RTC is supplied with power via the second DC/DC converter, even during the sleep mode of the microcontroller. The RTC may generate the wake-up signal based on its internal time scale.

Another aspect of the present invention relates to a method for supplying power to the control electronics according to the present invention. The method may be carried out for control electronics installed in a vehicle and connected to an HV battery system of the vehicle and to a low voltage battery of the vehicle. In other words, power may be supplied to control electronics of a battery system of a vehicle, such as an electric vehicle, with a low voltage battery. The control electronics include: a first DC/DC converter with a first input node that is configured to be connected to the battery system and with an output node that is connected to a microcontroller that is configured to control the first DC/DC converter; a wake-up circuit that includes a low voltage sub circuit and a sub circuit on the high voltage side that are galvanically isolated from each other; and a second DC/DC converter that has an input node, which is configured to be connected to the low voltage battery and an output node connected to the wake-up circuit. The low voltage sub circuit is configured to transmit electrical energy received from the second DC/DC converter to the sub circuit on the high voltage side in response to a received wake-up signal, and the sub circuit on the high voltage side is configured to receive electrical energy from the low voltage sub circuit and transmit it to the first DC/DC converter.

In an active mode of the microcontroller, the method of supplying power, according to an embodiment, includes supplying the microcontroller with a supply voltage that is generated by the first DC/DC converter based on an output voltage of the battery system, and controlling the first DC/DC converter via the microcontroller. In its active mode, the microcontroller further performs at least one control function with respect to the battery system, such as measurement of voltages, currents, and/or the like, active balancing and/or passive balancing. In other words, during an active mode of the microcontroller, the control electronics concerned with the actual operation of the battery system are self-supplied by the battery system.

In a sleep mode of the microcontroller, the method of supplying power, according to an embodiment, includes supplying the low voltage sub circuit with an input voltage that is generated by the second DC/DC converter based on an output voltage of the low voltage battery. Further, in a sleep mode, a CAN receiver and an RTC of the low voltage side may be supplied with power by the low voltage battery and the second DC/DC converter. This may also be performed during the active mode of the microcontroller. However, for the present invention, these actions may be mainly relevant with respect to the sleep mode of the microcontroller. In the sleep mode of the microcontroller, the method may further include: transmitting electrical energy from the low voltage sub circuit to the sub circuit on the high voltage side in response to a wake-up signal received by low voltage sub circuit. In some examples, the wake-up signal may be received from a board net of the vehicle, via a CAN bus of the vehicle, from a CAN transceiver, or from an RTC. Also, the wake-up signal may be received from ignition (e.g., from the ignition mechanism). The wake-up signal is received, when a wake up of the HV battery system is desired, for example, due to an increased power demand of a load of the HV battery system, such as, a motor of the vehicle. In some examples, a voltage received from the second DC/DC converter is converted to AC, transmitted across the galvanic isolation, and reconverted to DC by the sub circuit on the high voltage side. The DC voltage may be outputted to the first DC/DC converter and/or used to generate a control signal for the first DC/DC converter. The control signal may be applied to a switching input of the first DC/DC converter. In other words, the method of supplying power during the sleep mode of the microcontroller further includes controlling the first DC/DC converter via the sub circuit on the high voltage side for waking up the microcontroller, that is, for setting the microcontroller from the sleep mode of the microcontroller to the active mode of the microcontroller as described above.

In a further embodiment, control electronics including a CAN transceiver that is connected to a CAN bus and/or that is connected to the microcontroller via a CAN interface are supplied with power by the second DC/DC converter such that the power consumption of the first DC/DC converter for the CAN transceiver is zero. In a further embodiment, control electronics including a real time clock, RTC, connected to the microcontroller via an SPI are supplied with power by the second DC/DC converter such that the power consumption of the first DC/DC converter for the RTC is zero. The above methods may be applied for all further electronic components that are also used during the sleep mode of the microcontroller, such that the power consumption of the microcontroller is substantially zero during its sleep mode.

Another aspect of the present invention relates to a battery system that includes a plurality of battery cells that are connected in series and/or in parallel between a ground node and a voltage supply node. In other words, a voltage corresponding to the added voltage of the battery cells connected in series is applied between the ground node and the voltage supply node. The plurality of battery cells may further include, a plurality of submodules, each including a plurality of cells connected in parallel. The submodules may be connected in series between the ground node and the voltage supply node. The battery system of the invention further includes control electronics according to embodiments of the present invention, wherein the first input node of the first DC/DC converter is connected to the voltage supply node.

In some embodiments, the battery system is in a vehicle and includes control electronics including: a first DC/DC converter with a first input node that is connected to the battery system and with an output node that is connected to a microcontroller, which is configured to control the first DC/DC converter; a wake-up circuit that includes a low voltage sub circuit and a sub circuit on the high voltage side that are galvanically isolated from each other; and a second DC/DC converter that has an input node, which is configured to be connected to the low voltage battery and an output node connected to the wake-up circuit. The low voltage sub circuit may be configured to transmit electrical energy received from the second DC/DC converter to the sub circuit on the high voltage side in response to a received wake-up signal, and the sub circuit on the high voltage side may be configured to receive electrical energy from the low voltage sub circuit and transmit it to the first DC/DC converter. In an embodiment, the microcontroller is configured to perform at least one control function with respect to at least one of the plurality of battery cells.

Another aspect of the present invention relates to a vehicle including a low voltage battery and a battery system according to an embodiment of the present invention, wherein the input node of the second DC/DC converter is connected to the low voltage battery. The vehicle may be an electric vehicle or a hybrid vehicle including an electric motor supplied with power by the battery system for an electric driving mode of the vehicle. In some embodiments, the vehicle includes a low voltage battery, a battery system including a plurality of battery cells that are connected in series and/or in parallel between a ground node and a voltage supply node, and control electronics including: a first DC/DC converter with a first input node that is connected to the battery system and with an output node that is connected to a microcontroller, which is configured to control the first DC/DC converter; a wake-up circuit that includes a low voltage sub circuit and a sub circuit on the high voltage side that are galvanically isolated from each other; and a second DC/DC converter that has an input node, which is connected to the low voltage battery, and an output node connected to the wake-up circuit. The low voltage sub circuit may be configured to transmit electrical energy received from the second DC/DC converter to the sub circuit on the high voltage side in response to a received wake-up signal, and the sub circuit on the high voltage side may be configured to receive electrical energy from the low voltage sub circuit and transmit it to the first DC/DC converter.

In an embodiment, the low voltage sub circuit and the sub circuit on the high voltage side are galvanically isolated from each other across a crash interface of the vehicle. The interface electrically isolates a high voltage domain and a low voltage domain of the vehicle. The respective domains include the respective energy sources, that is, an LV battery and an HV battery system, and the respective consumers (loads) operated (supplied) by the respective energy sources. Separating the domains via the crash interface contributes to the operative security of the vehicle and may even be legally required for putting the vehicle on public roads. In this embodiment, the interfaces between the HV domain and the LV domain, that is, at least the SPI and the CAN interface as described above, form a part of the crash interface.

Further aspects of the present invention are disclosed in the dependent claims, the appended drawings as well as the following detailed description of the appended drawings.

BRIEF DESCRIPTION OF THE DRAWINGS

Features of embodiments according to the present invention will become apparent to those of ordinary skill in the art by the description provided herein of example embodiments with reference to the attached drawings, in which.

DETAILED DESCRIPTION

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and in the following, redundant descriptions may be omitted. The present invention, however, may be embodied in various forms, and should not be construed as being limited to only the illustrated embodiments herein. Rather, these embodiments are provided as examples so that this disclosure will be thorough and complete, and will fully convey the aspects and features of the present invention to those skilled in the art.

Accordingly, processes, elements, and techniques that are not considered necessary to those having ordinary skill in the art for a complete understanding of the aspects and features of the present invention may not be described. In the drawings, the relative sizes of elements, layers, and regions may be exaggerated for clarity.

Figure 1:
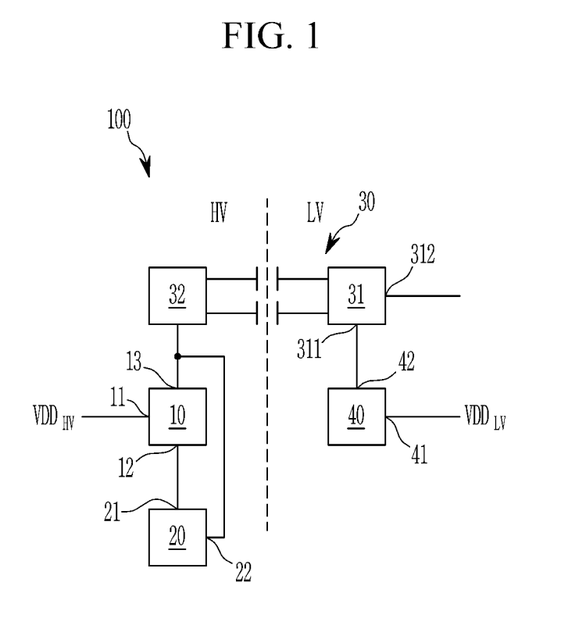
FIG. 1 is a block diagram illustrating control electronics for a battery system of a vehicle with a low voltage battery according to a first example embodiment.

FIG. 1 shows a schematic illustration of control electronics 100 for a battery system of a vehicle with a low voltage battery according to a first embodiment. The control electronics 100 are divided into a high voltage domain HV and a low voltage domain LV that are separated from each other via a crash interface. The HV domain includes a buck converter (or DC/DC converter) 10 that has an input node (e.g., an input terminal/port) 11, which is connected to a battery system's power output for receiving a supply voltage $VDD_{HV}$ of the battery system. The buck converter 10 further includes a switching input 13 for receiving a PWM control signal to set the duty cycle of the buck converter 10 and an output node (e.g., an output terminal/port) 12 for outputting the converted voltage. The output node (e.g., an output terminal/port) 12 is connected to an input node (e.g., an input terminal/port) 21 of a microcontroller 20 that is configured to output a control signal to the switching input 13 of the buck converter 10 via a control output 22 to control the buck converter 10. During an operation mode of the microcontroller 20, it controls the buck converter 10 such that the buck converter 10 derives the supply voltage for the microcontroller 20 from $VDD_{HV}$ by setting the duty cycle. The microcontroller 20 is further configured to perform at least one control function with respect to the battery system, such as, measuring of voltages or currents and balancing. Hence, the HV domain of the control electronics 100, that is, microcontroller 20, is self-supplied by the battery system that is controlled by the microcontroller 20 during operation mode.

The LV domain includes an LDO regulator 40 that includes an input node (e.g., an input terminal/port) 41 configured to be connected to a low voltage battery of the vehicle, that is, the starter battery of the vehicle, to receive an output voltage $VDD_{LV}$ from the starter battery. The LDO regulator 40 further includes an output node (e.g., an output terminal/port) 42 for outputting a regulated voltage derived from $VDD_{LV}$ to a power input (e.g., a power input terminal/port) 311 of a low voltage sub circuit 31 of a wake-up circuit 30.

The wake-up circuit 30 spans across the crash interface from the low voltage domain to the high voltage domain, as the low voltage sub circuit 31 is disposed in the LV domain and a sub circuit on the high voltage side 32 is disposed in the HV domain. The low voltage sub circuit 31 and the sub circuit on the high voltage side 32 are galvanically isolated (e.g., there may be no direct conduction path between the low voltage sub circuit 31 and the sub circuit on the high voltage side 32). The low voltage sub circuit 31 further includes a signal input 312 that is configured to receive a wake-up signal, for example, from a control unit of the vehicle via a communication bus of the vehicle. A schematic illustration of a wake-up circuit 30 is illustrated in FIG. 4.

Figure 4:
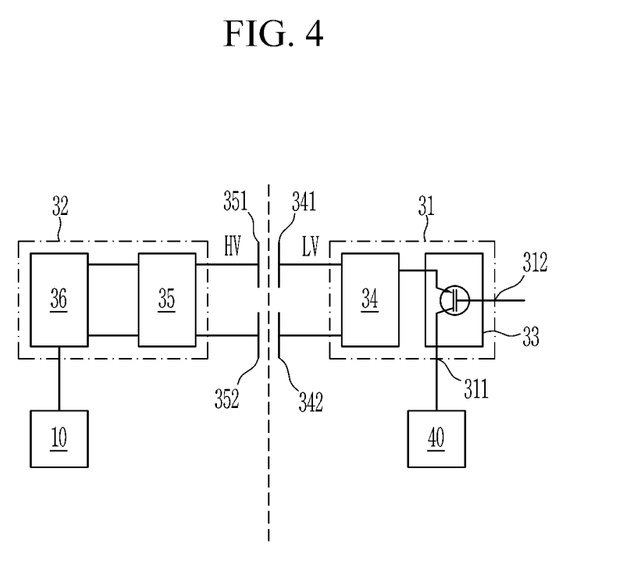
FIG. 4 is a block diagram illustrating a wake-up circuit according to an example embodiment.

As illustrated in FIG. 4, the wake-up circuit 30 is configured as an isolated DC/DC converter including an input stage 33, a DC/AC inverter 34, an AC/DC rectifier 35, and an output stage 36. The input stage 33 is configured to receive an input voltage from the second DC/DC converter 40, and the DC/AC inverter 34 is configured to receive the input voltage from the input stage 33 and to output an AC voltage to first electrodes 341 and 342 of a first and second capacitor or of a primary winding of a transformer. In the sub circuit on the high voltage side 32, the AC/DC rectifier 35 is configured to receive an AC voltage from second electrodes 351 and 352 of the first and second capacitor or of a secondary winding of a transformer and to output a DC voltage, and an output stage 36 is configured to output the DC voltage received from the AC/DC rectifier to a switching input 13 of the buck converter 10.

The wake-up circuit 30 is configured to receive electrical energy from the LDO regulator 40 via the low voltage sub circuit 31 and, in response to a received wake-up signal, to transmit the electrical energy across the galvanic isolation to the sub circuit on the high voltage side 32. The sub circuit on the high voltage side 32 is further configured to output the received electrical energy, or a signal derived thereof, to the switching input 13 of the buck converter 10. Hence, even if the buck converter 10 is not controlled by the microcontroller 20 in a sleep mode of the microcontroller 20, that is, in an inactive mode of the buck converter 10, the sub circuit on the high voltage side 32 can control the buck converter 10 to provide the supply voltage of the microcontroller 20 derived from the battery output voltage $VDD_{HV}$ to the input node (e.g., an input terminal/port) 21 of the microcontroller 20. In response to receiving the supply power, the microcontroller 20 wakes up and takes over control of the buck converter 10 via the control output 22. Hence, a wake-up function of the HV domain can be performed solely based on output of the LV domain.

Figure 2:
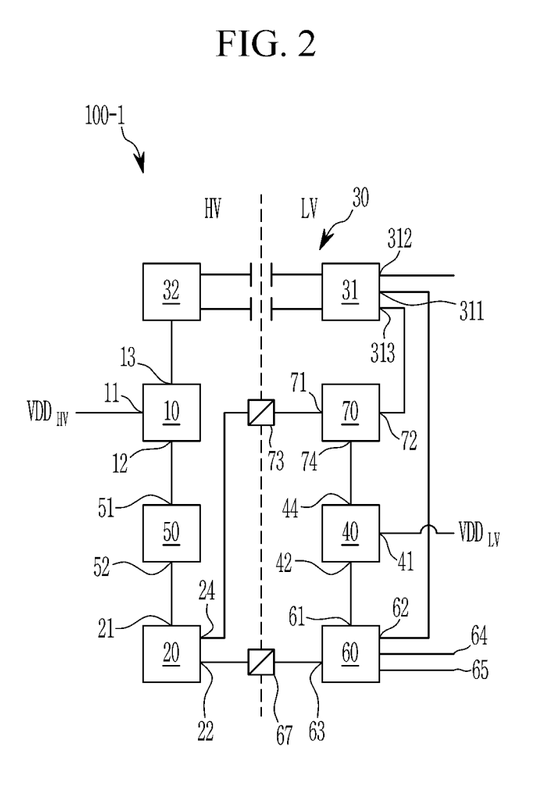
FIG. 2 is a block diagram illustrating control electronics for a battery system of a vehicle with a low voltage battery according to a second example embodiment.

FIG. 2 is a schematic illustration of control electronics 100 for a battery system of a vehicle with a low voltage battery according to a second embodiment. Portions of the description of the second embodiment that overlap with the description of the first embodiment may not be repeated herein.

The control electronics 100-1 of the second embodiment differ from the first embodiment in that the HV domain further includes a system basis chip 50 interconnected between the buck converter 10 and the microcontroller 20. For example, an input node (e.g., an input terminal/port) 51 of the system basis chip 50 may be connected to the output node (e.g., an output terminal/port) 12 of the buck converter 10, and an output node 52 (e.g., an output terminal/port) of the system basis chip 50 may be connected to the input node 21 of the microcontroller 20. The control electronics 100-1 of the second embodiment further differ from the first embodiment in that the LV domain further includes a CAN transceiver 60 and a real time clock (RTC) 70.

The CAN transceiver 60 includes a power input 61 that is connected to the output node (e.g., an output terminal/port) 42 of the LDO regulator 40 to receive a supply voltage thereof. The CAN transceiver 60 further includes a power output 62 that is connected to a power input (e.g., a power input terminal/port) 311 of the low voltage sub circuit 31 for transmitting electrical energy to the low voltage sub circuit 31. The CAN transceiver 60 is further connected to a CAN bus, which includes a high CAN line 64 and a low CAN line 65 for performing communication with control units of the vehicle or other loads. The CAN transceiver 60 further communicates with the microcontroller 20 via a CAN interface 67 and a first I/O interface 23 of the microcontroller 20. This allows for communicating control signals and/or information from the vehicle, for example, a load request from an electric motor, to the microcontroller 20 for the microcontroller 20 to control the battery system accordingly.

The RTC 70 includes a first I/O interface 71 and a second I/O interface 72 that are both and individually configured to receive and/or transmit control signals as well as supply power. In an embodiment, the RTC 70 receives its supply power via a power output (e.g., a power output terminal/port) 313 of the low voltage sub circuit 31. In some examples, the RTC 70 includes an input node (e.g., an input terminal/port) 74 that is connected to a second output node (e.g., a second output terminal/port) 44 of the LDO regulator 40, which supplies power to the RTC 70. The RTC 70 further communicates with the microcontroller 20 via an SPI 73 and a second I/O interface 24 of the microcontroller 20 for providing a clock signal to the microcontroller 20. The control electronics 100-1 of FIG. 2 further differ from those of FIG. 1 in that the electrical energy is received by the low voltage sub circuit 31 from the LDO regulator 40 via the CAN transceiver 60.

Figure 3:
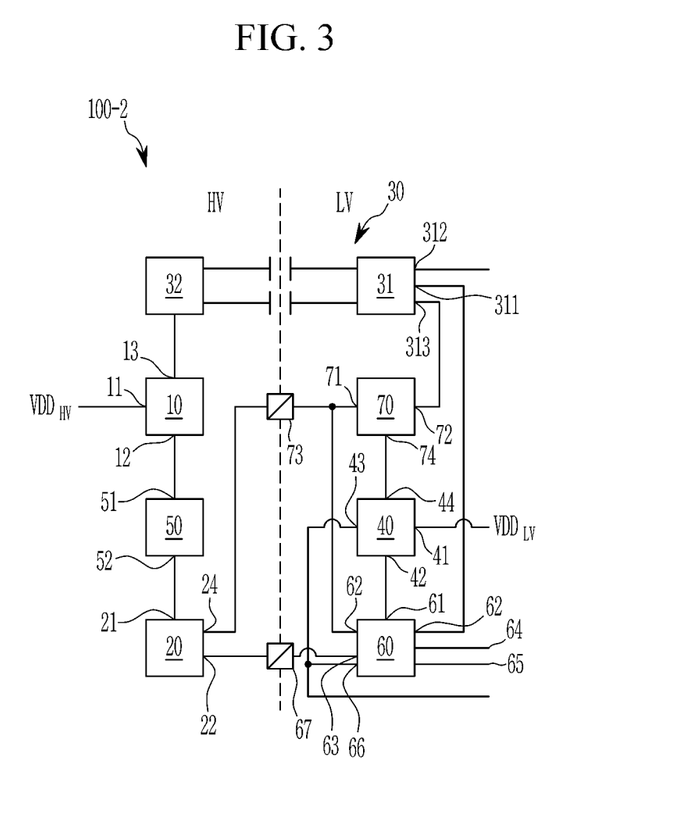
FIG. 3 is a block diagram illustrating control electronics for a battery system of a vehicle with a low voltage battery according to a third example embodiment.

FIG. 3 is a schematic illustration of control electronics 100-2 for a battery system of a vehicle with a low voltage battery according to a third embodiment. Portions of the description of the second embodiment that overlap with the description of the first embodiment may not be repeated herein.

Control electronics 100-2 of FIG. 3 differ from those of FIG. 2 in that the CAN transceiver 60 includes two power outputs 62 and is, via one of these power outputs, also connected to the RTC 70. Hence, the RTC 70 can be supplied with power by the CAN transceiver 60 or a power output 313 of the low voltage sub circuit 31. In some examples, the RTC 70 includes an input node (e.g., an input terminal/port) 74 that is connected to a second output node (e.g., a second output terminal/port) 44 of the LDO regulator 40, which supplies power to the RTC 70, then the power output 62 of the CAN transceiver can be used to transmit and/or receive signals via the SPI 73 that is used commonly with the RTC 70. Further, the low voltage sub circuit 31 can also be supplied with power redundantly by the CAN transceiver 60 or the RTC 70, such that power output 313 could also be a power input of the low voltage sub circuit 31. Control electronics 100-2 of FIG. 3 further differ from those of FIG. 2 in that the CAN transceiver 60 is connected to a ground line via a respective ground node (e.g., a respective ground terminal) 66 and in that the LDO regulator 40 is connected to the same ground line via a respective ground node (e.g., a respective ground terminal) 43. The ground node can also be utilized for diagnostic purposes, for example, for controlling the function of the LDO regulator 40 and/or the CAN transceiver 60.

Figure 5:
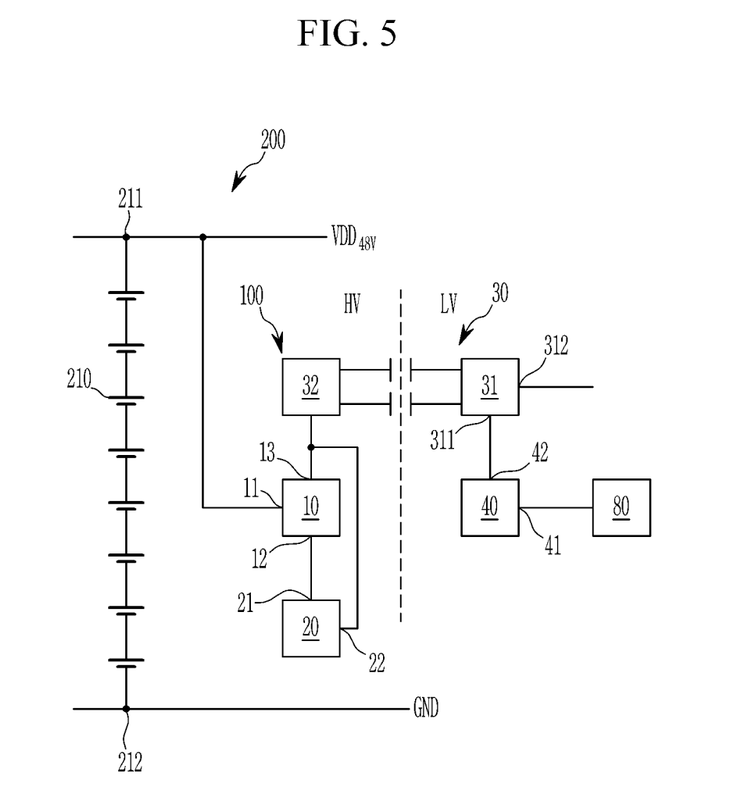
FIG. 5 is a schematic diagram illustrating electronic components of a battery system of a vehicle according to an example embodiment.

FIG. 5 is a schematic illustration of a battery system electronics 200 of a vehicle, according to an embodiment, that includes the control electronics 100 for a battery system according to the first embodiment. The battery system electronics 200 include a plurality of battery cells 210 electrically connected in series and/or in parallel between a first stack node (e.g., a voltage supply node) 211 and a second stack node (e.g., a ground node) 212. The first stack node 211 is a power output of the battery system for providing a high voltage supply voltage VDD, for example, 48 V. The second stack node 212 is at ground potential. The input node (e.g., an input terminal/port) 11 of the first DC/DC converter 10 is connected to the first stack node 211 and receives a 48 V high voltage supply voltage VDD.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. The electrical connections or interconnections described herein may be realized by wires or conducting elements, for example, on a PCB and/or another kind of circuit carrier. The conducting elements may include metallization, for example, surface metallizations and/or pins, and/or may include conductive polymers or ceramics. Further electrical energy might be transmitted via wireless connections, for example, using electromagnetic radiation and/or light.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as a random access memory (RAM). The computer program instructions may also be stored in other non-transitory computer readable media such as a CD-ROM, flash drive, or the like.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the terms "use," "using," and "used" may be considered synonymous with the terms "utilize," "utilizing," and "utilized," respectively.

As used herein, the term "substantially," "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value. Also, a person of skill in the art should recognize that the functionality of various computing devices may be combined or integrated into a single computing device, or the functionality of a particular computing device may be distributed across one or more other computing devices without departing from the scope of the present invention, which is defined by the following claims and equivalents thereof.

LISTING OF SOME OF THE REFERENCE NUMBERS 10 first DC/DC converter
11 input node
12 output node
13 switching input
20 microcontroller
21 input node
22 control output
23 first I/O interface
24 second I/O interface
30 wake-up circuit
31 low voltage sub circuit
311 power input
312 signal input
313 power output node
32 sub circuit on the high voltage side
33 input stage
34 DC/AC converter
341 first electrode of first capacitor
342 first electrode of second capacitor
351 second electrode of first capacitor
352 second electrode of second capacitor 35 AC/DC rectifier
36 output stage
40 second DC/DC converter
41 input node
42 output node
43 ground node
44 second output node
50 system basis chip
51 input node
52 output node
60 CAN transceiver
61 power input
62 power output
63 signal I/O interface
64 high CAN line
65 low CAN line
66 ground node
67 CAN interface
70 real time clock
71 first I/O interface
72 second I/O interface
73 SPI
74 input node
80 low voltage battery
200 battery system electronics
210 battery cell
211 first stack node
212 second stack node

What is claimed is:

1. Control electronics for a battery system of a vehicle with a low voltage battery, the control electronics comprising:
   a first direct current to direct current (DC/DC) converter comprising a first input terminal configured to be connected to the battery system, and an output terminal connected to a microcontroller that is configured to control the first DC/DC converter;
   a wake-up circuit comprising a low voltage sub circuit on a low voltage side and a sub circuit on a high voltage side that are galvanically isolated from each other via a transformer or at least one capacitor; and
   a second DC/DC converter comprising an input terminal configured to be connected to the low voltage battery, and an output terminal connected to the wake-up circuit;
   wherein the low voltage sub circuit on the low voltage side is configured to transmit electrical energy received from the second DC/DC converter to the sub circuit on the high voltage side in response to a wake-up signal received from the second DC/DC converter at a signal input of the low voltage sub circuit, and
   wherein the sub circuit on the high voltage side is configured to receive the electrical energy from the low voltage sub circuit and to transmit the received electrical energy to the first DC/DC converter.

2. The control electronics of claim 1, wherein the microcontroller is further configured to perform at least one control function with respect to the battery system.

3. The control electronics of claim 1, wherein the first DC/DC converter is configured to generate a supply voltage for supply to the microcontroller based on an output voltage $VDD_{HV}$ of the battery system.

4. The control electronics of claim 1, wherein the wake-up circuit comprises an isolated DC/DC converter.

5. The control electronics of claim 1, wherein the low voltage sub circuit comprises:
   an input stage configured to receive an input voltage from the second DC/DC converter; and
   a direct current to alternating current (DC/AC) inverter configured to receive the input voltage from the input stage and to output an AC voltage to a first electrode of the at least one capacitor, and
   wherein the sub circuit on the high voltage side comprises:
   an alternating current to direct current (AC/DC) rectifier configured to receive an AC voltage from a second electrode of the at least one capacitor and to output a DC voltage; and
   an output stage configured to output the DC voltage received from the AC/DC rectifier to a switching input of the first DC/DC converter.

6. The control electronics of claim 1, wherein the sub circuit on the high voltage side is further configured to generate a pulse width modulation (PWM) signal for controlling the first DC/DC converter from the electrical energy received from the low voltage sub circuit.

7. The control electronics of claim 1, further comprising a system basis chip interconnected between the first DC/DC converter and the microcontroller.

8. The control electronics of claim 1, further comprising a controller area network (CAN) transceiver configured to receive electrical energy from the output terminal of the second DC/DC converter, the CAN transceiver being connected to a CAN bus and connected to the microcontroller via a CAN interface.

9. The control electronics of claim 1, further comprising a real time clock (RTC) configured to receive power from the second DC/DC converter and connected to the microcontroller via a serial peripheral interface (SPI).

10. A method for supplying power to the control electronics of claim 1, the method comprising:
    in an active mode of the microcontroller:
       supplying the microcontroller with a supply voltage generated by the first DC/DC converter based on an output voltage of the battery system; and
       controlling the first DC/DC converter via the microcontroller, and
    in a sleep mode of the microcontroller:
       supplying the low voltage sub circuit with an input voltage generated by the second DC/DC converter based on an output voltage of the low voltage battery;
       transmitting electrical energy from the low voltage sub circuit to the sub circuit on the high voltage side in response to a wake-up signal received by the low voltage sub circuit; and
       controlling the first DC/DC converter via the sub circuit on the high voltage side for waking up the microcontroller.

11. The method of claim 10, wherein, in the sleep mode of the microcontroller, a CAN transceiver and/or a real time clock (RTC) are configured to receive power from the second DC/DC converter and a power consumption of the first DC/DC converter is substantially zero.

12. A battery system comprising:
    a plurality of battery cells connected in series and/or in parallel between a ground node and a voltage supply node; and
    the control electronics according to claim 1,
    wherein the first input terminal of the first DC/DC converter is connected to the voltage supply node.

13. The battery system of claim 12, wherein the microcontroller is configured to perform at least one control function with respect to at least one of the plurality of battery cells.

14. A vehicle comprising:
- the low voltage battery and the battery system according to claim 12,
- wherein the input terminal of the second DC/DC converter is connected to the low voltage battery.

* * * * *